March 31, 1931.  G. H. NILES  1,798,802

METHOD OF AND APPARATUS FOR BURNING CARBONATE ROCK

Filed April 20, 1923

Inventor
Glenn H. Niles
By His Attorney
Edmund G. Borden

Patented Mar. 31, 1931

1,798,802

UNITED STATES PATENT OFFICE

GLENN H. NILES, OF RIDGEWOOD, NEW JERSEY, ASSIGNOR, BY DIRECT AND MESNE ASSIGNMENTS, OF ONE-HALF TO DOHERTY RESEARCH COMPANY, A CORPORATION OF DELAWARE, AND OF ONE-HALF TO ARTHUR E. TRUESDELL, OF PITTSFIELD, MASSACHUSETTS

METHOD OF AND APPARATUS FOR BURNING CARBONATE ROCK

Application filed April 20, 1923. Serial No. 633,343.

This invention relates to a method of and an apparatus for burning carbonate rock, more particularly the invention relates to lime kilns of the class known as a continuous operating, long flame kiln, and comprises a method of and an apparatus for burning limestone to produce lime therefrom, in which the operation may be carried on more economically and at a lower temperature than has heretofore been attained in kiln operation.

In the commercial burning of limestone to produce lime therefrom it is essential that the temperatures during the burning operation be regulated within certain well defined limits, in order to obtain a satisfactory product. If the limestone which is being treated is not sufficiently heated there remains in the product some of the undecomposed limestone or calcium carbonate which does not slake with water and which renders the lime "lean." If, on the other hand, the limestone is overheated re-carbonation and semifusion take place, and the lime product combines with water very slowly or incompletely, and is therefore unsatisfactory for ordinary uses. It has long been recognized that for successful burning of lime the gases evolved therefrom must escape freely from the kiln, and various means have been employed to facilitate the escape of gases. It has been attempted, for instance, to burn limestone under a partial vacuum, but none of the processes heretofore employed has been successful on account of the inability to control accurately the combustion of the fuel under these conditions. It is a well known fact that the higher the degree of vacuum, the lower will be the temperature necessary to remove carbon dioxide from limestone. In the systems heretofore employed, however, in which gases from the kiln were withdrawn under a partial vacuum and returned under the grate or fuel bed, there was an outstanding defect which prevented satisfactory operation of the process, namely, that as the vacuum or the system was increased, the supply of primary air was increased, which caused a greater supply of heat to be generated with the lower pressures in the system. This result is undesirable since less heat is required at lower pressures than at higher pressures to drive off carbon dioxide from the limestone, and a smaller amount of primary air should be supplied under the grate or fuel bed with a decrease in pressure in the system.

It is the primary object of the present invention to provide a method of and an apparatus for burning limestone for the production of lime whereby the pressures and temperatures may be controlled during the burning, and whereby a more uniform product and a greater heat efficiency are obtained than has heretofore been attained.

Another object of the invention is to provide a process of burning limestone whereby the combustion of fuel may be regulated to correspond with the changes in pressure in the system.

Another object of the invention is to provide means for returning gases from the top of the kiln to the lower portion of the kiln above the fuel bed in order to dilute the combustion gases and to attain uniformity of heating without interference with regulation of fuel combustion.

A further object of the invention is to provide means for introducing steam either under the fuel bed, or both over and under the fuel bed, in order to assist in the release of carbon dioxide from the limestone at a low temperature.

With these and other objects in view the invention consists in the process and apparatus hereinafter described and particularly defined in the claims.

The present invention overcomes the difficulties formerly encountered in the operation of lime kilns in which gases are circulated, in that the combustion of fuel is rendered independent of the return of gases from the top of the kiln by introducing the gases to be returned to the system above the fuel bed and independently controlling the introduction of primary air under the fuel bed. It is possible by this means to supply less heat at lower pressures in the kiln than is supplied at higher pressures by properly regulating the supply of primary air to the furnace. By the introduction of kiln gases into the furnace above the fuel bed, the combustion gases from the furnace are diluted and cooled before coming into contact with the limestone, and the heat from the combustion of the fuel is thereby gradually and evenly imparted to the material in the kiln.

In the preferred form of the invention provision is made for the introduction of steam either below or above the fuel bed to assist in the release of carbon dioxide from the limestone. By injecting steam above the fuel bed in the furnace the steam exerts its partial pressure in the mixture of gases passing through the limestone and thus in effect it decreases the partial pressure of carbon dioxide in the gases. The proportion of carbon dioxide present in the gases is thus reduced and the tendency of carbon dioxide to come off from the limestone is greatly increased. By the injection of steam below the fuel bed the well known water gas reaction takes place in which carbon monoxide and hydrogen are produced. By the simultaneous injection of the proper amount of air below the grate with the steam, however, a sufficient amount of oxygen is supplied so that the carbon monoxide, produced by the action of steam on the carbon of the fuel, burns completely to carbon doxide, and the hydrogen resulting from the reaction burns to water vapor. The increase in the proportion of water vapor in the gases results in a decrease of the partial pressure of the carbon dioxide as explained above and therefore assists in the release of carbon dioxide from the limestone mass.

The invention may be best described in connection with the accompanying drawing in which:

Fig. 1 is a view in elevation, partly in section, of the kiln and apparatus associated therewith.

Fig. 2 is a sectional view in detail of a portion of the furnace showing steam injecting means above and below the furnace grate.

The preferred form of the invention comprises a lime kiln having a vertical cylindrical shell 10 and a furnace 12 in connection therewith which extends outwardly from the shell near the base thereof, and is disposed in such a manner that gases of combustion from the furnace may pass freely to the interior of the shell. The base of the shell 10 has a lining of heat insulating material 14 which extends upwardly from the base of the furnace, serving as supporting walls at the inner portion thereof, and extends downwardly and inwardly therefrom to form a suitable supporting surface for the charge in the kiln. At the lower portion of the kiln is a discharge outlet 16 which is normally closed by a cover plate 18. Below the discharge outlet of the kiln the lining is built in such a manner as to form a large hollow space to enable the burned material to be readily withdrawn from the kiln. The cover plate 18 serves to retain the charge within the kiln, and to provide a gas tight closure for the discharge end of the kiln. The upper portion of the kiln, above the furnace 12 is lined with heat resisting material 20, similar to the lining 14 at the discharge end of the kiln, and serves to prevent heat conduction through the sides of the kiln, and to protect the walls thereof. At the top of the kiln is an opening 22 through which the kiln may be charged, and which is normally closed by means of a removable cover plate 24 serving to maintain a gas tight closure during the operation of the kiln.

The furnace 12 is preferably constructed with two sets of grate bars 26 and 28, the sets being positioned on opposite sides of the kiln. Above the grate bars are firing doors 30, 32, and below the grates are ash pits 34, 36, having doors 38 and 40 communicating therewith. An air pump or fan 42 connected to a pipe 44 is employed for forcing air into the ash pits below the grate bars through pipes 46 and 48, communicating respectively with ash pits 34 and 36, and connected to the pipe 44. The air pipes 46 and 48 have dampers or valves 50 and 52 therein for regulating the admission of air to the pipes.

During the operation of the kiln, gases are withdrawn from the top thereof through a pipe 54 by means of a fan or blower 58. The fan 58 is connected at its outlet with a pipe 60 which communicates with a branch pipe 62 that in turn is connected with pipes 64 and 66 leading into furnace above the grates 26 and 28 respectively. The pipes 54, 64 and 66 are provided with valves 56, 68 and 70 respectively, by which the volume and pressure of the gases entering the kiln may be accurately controlled. In order to maintain the pressure in the kiln below atmospheric, it is necessary to withdraw gases therefrom at substantially a greater rate than they are generated by the evolution of carbon dioxide from the limestone, and by the regulated admission and passage of air through the fuel bed. To accomplish this result, a pipe 72, having a valve 74 therein is attached to the circulating system preferably at the junction of pipes 60 and 62 by which part of the waste gases may exhaust to the atmosphere. It is desirable under ordinary conditions to maintain a subatmospheric pressure of substantially minus four inches of water at the top of the kiln, and approximately minus two or three inches of water at the points of admission of return gases above the fuel bed which pressures are attained by the proper regulation of the fan 58 and the valves 68, 70 and 74. The admission of primary air below the fuel bed is regulated so as to maintain a minus pressure above the fuel bed and also to attain the desired amount of heat for carrying on the process, the supply of air being decreased as the temperature of the limestone in the kiln approaches the temperature at which carbon dioxide is evolved from the limestone.

In order to decrease the partial pressure of the carbon dioxide in the kiln, steam may be passed into the apparatus either above or below the grate bars, or both above and below the grate bars, if desired. A detailed view showing the steam pipe connections is shown in Fig. 2, a steam pipe 75 being connected to the ash pit below the grate bars 26 so as to inject air with the steam in the desired proportions through an aperture 80. The pipe 75 has a collar 79 thereon. Collar 79 is adjustable toward and away from the contracting mouth 81 fitted on the outside of aperture 80 to regulate the effective opening of the aperture 81. Pipes 75 and 76 have valves 77 and 78 therein to regulate the flow of steam. Steam pipes 76 are mounted in the open discharge ends of pipes 64 and 66 so that they may be used as steam injectors for inducing circulation of gases removed from the top of the kiln through the combustion chambers of furnaces 12 and into the lower portion of the kiln. Steam injectors 75 may thus be used in place of pump 42 for introducing air into the heating furnace and steam injectors 76 may be used in place of or in conjunction with pump 58 for reintroducing gases removed from the top of the kiln through pipes 62, 64 and 66 into the lower portion of the kiln.

By the use of the method and apparatus which have been described an accurate control of calcining conditions may be maintained throughout the operation, and a uniform product is thereby attained. The improved method accelerates the burning of lime due to the lower temperatures which may be used for calcining. By maintaining a reduced pressure in the kiln a lower temperature may be used. By the use of steam the partial pressure of carbon dioxide in the furnace will be decreased which will permit the calcining of lime at a lower temperature. Steam entering above the grates affects the partial pressure of $CO_2$ directly while steam entering below the grates affects the partial pressure of $CO_2$ indirectly, but doubly due to the fact that in passing through the red hot fuel in the fuel bed it is decomposed into two molecules of CO and $H_2$. The kiln gases and steam tend to produce a long flame combustion which carries the heat effectively up through the shaft, thus facilitating rapid lime burning operation. Therefore by diluting the combustion gases a larger body of heated gases is available for burning the lime and due to the fact that the lime may be burned at lower temperatures an increased capacity of the furnace is provided. It is obvious that various modifications may be made in the method and in the apparatus as will be apparent to one skilled in the art without departing from the scope of the invention as defined in the claims.

Any suitable charging means may be employed for charging the apparatus. It may be advantageous to use a charging means by which the kiln may be continuously charged without breaking or substantially reducing the vacuum therein. Charging means suitable for this purpose are, however, known to the trade and therefore are not illustrated or claimed herein. It is obvious also that any desired form of discharging apparatus may be employed for discharging the finished product from the kiln without interfering with the vacuum therein or the operation of the apparatus. The primary air which is forced under the fuel bed by the pump or fan 42 may be preheated by passing it through preheating flues 45 in the discharge end of the kiln. The apparatus as described may be employed for burning limestone, dolomite, magnesite or other carbonate rock and is not limited therefore to the burning of limestone to produce lime therefrom.

Having thus described the invention, what is claimed as new is:

1. A method for producing lime from limestone which comprises heating limestone under atmospheric pressure in a kiln by combustion gases while circulating a mixture of combustion gases and gases given off by the limestone from the top of the kiln to a point near the bottom of the kiln and near the source of heat for the kiln, and controlling the rates of introduction of gases into the kiln and of removal of gases from the top of the kiln so as to maintain a pressure of between 2 and 3 inches of water below atmospheric at the point where said circulated gases re-enter the kiln.

2. A method for producing lime from limestone which comprises heating limestone in a kiln by combustion gases while circulating a mixture of combustion gases and gases given off by the limestone from the top of the kiln to a point near the bottom of the kiln and intermediate the kiln and the source of said combustion gases, and controlling the rates of introduction of gases into the kiln and of removal of gases from the top of the kiln so as to maintain a pressure of between 2 and 3 inches of water below atmospheric at the point where said circulated gases reenter the kiln and a pressure of substantially 4 inches of water below atmospheric at the point where said circulated gases are taken from the kiln.

3. In apparatus for burning lime, an upright shaft kiln having a heating gas inlet in its lower portion and a gas offtake near its top, said kiln being substantially sealed against entrance and exit of gas except through said inlet and offtake, respectively, a furnace combustion chamber communicating with said gas inlet, grates for supporting fuel in said combustion chamber, and means whereby optimum lime burning temperatures and pressures can be maintained in the kiln, said means comprising devices for delivering air at a controllable pressure and rate into said furnace from beneath said grates, and a pump and valved connections for continuously circulating gases removed through said offtake at a controllable rate and pressure through that portion of the kiln lying between said inlet and said offtake.

4. In apparatus for burning lime, a kiln having a heating gas inlet opening thereinto at one part thereof and having a gas offtake leading off therefrom at another point, said kiln being substantially sealed against entrance and exit of gas except at said inlet and offtake, respectively, a furnace combustion chamber, and means whereby optimum lime burning temperatures and pressures are maintained in that part of the kiln lying between said gas inlet and offtake, said means comprising a pump and connections for supplying air for supporting combustion of fuel in said combustion chamber at a controllable rate and pressure, and another pump and connections operable to remove gases from said kiln under subatmospheric pressure through said offtake and to reintroduce gases thus removed into the kiln at a controlled rate and pressure through said inlet.

5. In apparatus for burning lime, a shaft kiln having a heating gas inlet near its base and a gas offtake near its top, said kiln being substantially sealed against entrance and exit of gas except through said inlet and offtake, respectively, a furnace combustion chamber in closed communication with said gas inlet, a pump and valved connections for delivering air at a controllable rate and pressure into said combustion chamber, a second pump having a closed connection between its suction side and the gas offtake of the kiln, and means connected to the discharge side of said second pump for recycling gases removed through said offtake at a controllable rate and pressure into the lower portion of the kiln through said combustion chamber and inlet.

6. In apparatus for burning lime, an upright shaft kiln having a heating gas inlet near its base and having a gas offtake near its top, said kiln being substantially sealed against entrance and exit of gas except through said inlet and offtake, respectively, a furnace combustion chamber in closed communication with said gas inlet, means for supplying combustion air at a controllable rate and pressure to said combustion chamber, means for supplying steam at a controllable rate and pressure to said combustion chamber, a pump having a closed connection between its suction side and the gas offtake of the furnace, means connected with the discharge side of the pump for recycling gases removed through said offtake and pump at a controllable rate and pressure into the shaft through said furnace and inlet, and a valved pipe connection for carrying off any excess volume of gases removed from the shaft through said offtake and pump and not recycled.

7. In lime burning apparatus, the combination of an upright shaft kiln having a heating gas inlet near its base and having a gas offtake near its top, said kiln being substantially sealed against entrance of air except through said inlet, a furnace having a combustion chamber in closed communication with said inlet, a grate in said furnace underlying said combustion chamber, means for introducing air at a controlled rate and pressure beneath said grate, means for introducing steam into said furnace at points located both above and beneath said grate, and a pump and connections for removing gases from the top of said shaft through said offtake and for reintroducing gases thus removed at a controlled rate and pressure into the shaft through said combustion chamber and gas inlet.

8. A method for producing lime from limestone which comprises heating a charge of the limestone in a kiln under a subatmospheric pressure which varies in different portions of the kiln, supplying the heat for burning by means of a circuit of hot gases which are passed upwardly through the charge then removed from the top of the charge and reintroduced at a controlled rate and pressure into the lower portion of the charge admixed with heating gases in sufficient volume to maintain lime burning temperatures, and limiting the amount of air employed substantially to that which is supplied at a controlled rate and pressure to produce the heating gases.

In testimony whereof I affix my signature.
GLENN H. NILES.

CERTIFICATE OF CORRECTION.

Patent No. 1,798,802.  Granted March 31, 1931, to

GLENN H. NILES.

It is hereby certified that error appears in the printed specification of the above numbered patent requiring correction as follows: Page 3, line 95, claim 1, for "atmospheric" read subatmospheric; and that the said Letters Patent should be read with this correction therein that the same may conform to the record of the case in the Patent Office.

Signed and sealed this 16th day of February, A. D. 1932.

(Seal)

M. J. Moore,
Acting Commissioner of Patents.